(12) United States Patent
Lee

(10) Patent No.: US 9,041,354 B2
(45) Date of Patent: May 26, 2015

(54) ENERGY STORAGE SYSTEM AND METHOD OF CONTROLLING THE SAME

(75) Inventor: Eun-Ra Lee, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1217 days.

(21) Appl. No.: 12/950,077

(22) Filed: Nov. 19, 2010

(65) Prior Publication Data

US 2011/0148195 A1    Jun. 23, 2011

(30) Foreign Application Priority Data

Dec. 23, 2009 (KR) .................. 10-2009-0130024

(51) Int. Cl.
| | |
|---|---|
| *H02J 7/00* | (2006.01) |
| *H01M 10/44* | (2006.01) |
| *H02J 7/04* | (2006.01) |
| *H02J 1/12* | (2006.01) |
| *H02J 9/06* | (2006.01) |
| *H02J 7/35* | (2006.01) |

(52) U.S. Cl.
CPC . *H02J 9/061* (2013.01); *H02J 7/35* (2013.01); *Y02B 10/72* (2013.01); *Y02E 10/58* (2013.01)

(58) Field of Classification Search
CPC ............ H02J 3/385; H02J 3/383; H02S 40/32
USPC ........ 320/134, 101, 138, 140; 307/82, 46, 25, 307/26
See application file for complete search history.

(56) References Cited

U.S. PATENT DOCUMENTS

| | | | | |
|---|---|---|---|---|
| 5,499,178 | A * | 3/1996 | Mohan ........................... | 363/39 |
| 5,674,008 | A | 10/1997 | Allinson | |
| 6,353,304 | B1 * | 3/2002 | Atcitty et al. ................ | 320/116 |
| 7,497,615 | B2 | 3/2009 | Kim et al. | |
| 7,714,463 | B2 | 5/2010 | Su et al. | |
| 7,786,616 | B2 * | 8/2010 | Naden et al. .................... | 307/64 |
| 8,106,537 | B2 * | 1/2012 | Casey et al. .................... | 307/82 |
| 8,531,055 | B2 * | 9/2013 | Adest et al. .................... | 307/43 |
| 2002/0169523 | A1 | 11/2002 | Ross et al. | |
| 2003/0047209 | A1 * | 3/2003 | Yanai et al. .................. | 136/291 |

(Continued)

FOREIGN PATENT DOCUMENTS

| | | |
|---|---|---|
| JP | 54-128489 | 9/1979 |
| JP | 08-313367 | 11/1996 |

(Continued)

OTHER PUBLICATIONS

Korean Office Action issued by KIPO, dated Apr. 21, 2011, corresponding to Korean Patent Application No. 10-2009-0130024, together with Request for Entry.

(Continued)

*Primary Examiner* — M'Baye Diao
(74) *Attorney, Agent, or Firm* — Robert S. Bushnell, Esq.

(57) ABSTRACT

An energy storage system and a method of controlling the same is provided. The energy storage system may directly provide generated DC power or DC power stored in a battery to a DC load without performing a DC/AC conversion or an AC/DC conversion. Furthermore, in the case where a grid operates abnormally (e.g. power interruption) and the energy storage system functions as an uninterruptible power supply (UPS), power stored in a battery may be selectively provided to loads according to power remaining in a battery, and thus stored power may be used stably.

19 Claims, 6 Drawing Sheets

(56) References Cited

U.S. PATENT DOCUMENTS

| | | | |
|---|---|---|---|
| 2005/0151517 A1* | 7/2005 | Cook et al. | 323/207 |
| 2005/0231169 A1 | 10/2005 | Seo et al. | |
| 2006/0132102 A1 | 6/2006 | Harvey | |
| 2007/0029976 A1 | 2/2007 | Garcia et al. | |
| 2008/0067869 A1* | 3/2008 | Evans et al. | 307/11 |
| 2008/0150366 A1* | 6/2008 | Adest et al. | 307/77 |
| 2008/0272653 A1 | 11/2008 | Inoue et al. | |
| 2009/0027932 A1* | 1/2009 | Haines et al. | 363/95 |
| 2009/0080226 A1 | 3/2009 | Fornage | |
| 2009/0189574 A1 | 7/2009 | Le et al. | |
| 2009/0236916 A1* | 9/2009 | Nishimura | 307/80 |
| 2012/0059527 A1* | 3/2012 | Beaston et al. | 700/295 |

FOREIGN PATENT DOCUMENTS

| | | | |
|---|---|---|---|
| JP | 10023671 A | | 1/1998 |
| JP | 11-299122 A | | 10/1999 |
| JP | 11355974 A | | 12/1999 |
| JP | 2000-014025 A | | 1/2000 |
| JP | 2001245444 A | | 9/2001 |
| JP | 2004180467 | | 6/2004 |
| JP | 2005-224071 | | 8/2005 |
| JP | 2005-287091 A | | 10/2005 |
| JP | 2006-288002 A | | 10/2006 |
| JP | 2007-215257 | | 8/2007 |
| JP | 2009033797 | | 2/2009 |
| JP | 2009052991 | | 3/2009 |
| JP | 2009100502 A | | 5/2009 |
| JP | 2009109271 | | 5/2009 |
| JP | 2009-153338 | | 7/2009 |
| KR | 1998-043956 | | 9/1998 |
| KR | 10-2003-0038507 | | 5/2003 |
| KR | 10-2006-0007935 | | 1/2006 |
| KR | 10-0648135 | | 11/2006 |
| KR | 1020080044676 A | | 5/2008 |

OTHER PUBLICATIONS

Japanese Office Action issued on Apr. 23, 2013 by JPO in connection with Japanese Patent Application No. 2011-150750 (Cited in the Information Disclosure Statement of cross-referenced U.S. Appl. No. 13/082,827, filed May 31, 2013.).

Japanese Office action issued on Jan. 8, 2013 in the corresponding Japanese patent application No. 2011-150750 (Cited in the Information Disclosure Statement of cross-referenced U.S. Appl. No. 13/082,827, filed Feb. 27, 2013.).

European Search Report issued on Jan. 3, 2012 corresponding to European Patent Application Serial No. 11 181 283.0 (Cited in the Information Disclosure Statement of cross-referenced U.S. Appl. No. 13/082,827, filed Feb. 17, 2012.).

Korean Office action issued on Jul. 2, 2012 by the Korean Patent Office in the corresponding Korean Patent Application No. 10-2010-0091100 (Cited in the information Disclosure Statement filed on Jul. 24, 2012 of cross-referenced U.S. Appl. No. 13/082,827.).

Korean Office action issued on Sep. 23, 2011 by Korean Patent Office Korean Patent application No. 10-2010-0091100, (cited in the IDS filed on Nov. 7, 2011 of the related U.S. Appl. No. 13/082,827). Together with "Request for Entry".

The extended European Search Report issued on May 12, 2014 by EPO in connection with European Patent Application No. 10857041.7 which corresponds to PCT/KR2010/007438. (Cited in the Information Disclosure Statement of cross-referenced U.S. Appl. No. 13/820,948, filed Jun. 11, 2014.).

Japanese Office Action issued by Japanese Patent Office on Jun. 10, 2014 in connection with JP 2013-528098 which corresponds to the present application (Cited in the Information Disclosure Statement of cross-referenced U.S. Appl. No. 13/820,948, filed Jun. 30, 2014).

* cited by examiner

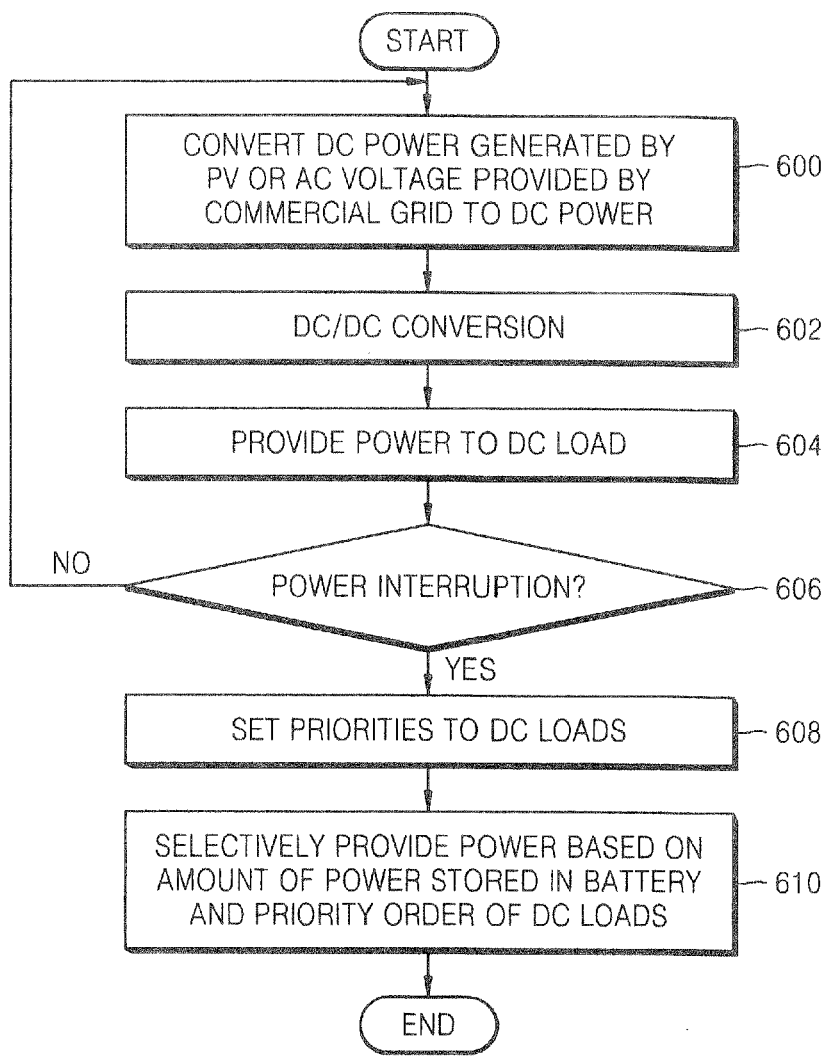

ENERGY STORAGE SYSTEM AND METHOD OF CONTROLLING THE SAME

RELATED APPLICATIONS

This application claims the benefit of Korean Patent Application No. 10-2009-0130024, filed on Dec. 23, 2009, in the Korean Intellectual Property Office, the disclosures of which are incorporated herein in their entirety by reference.

BACKGROUND

1. Field

The general inventive concept relates to an energy storage system and a method of controlling the same.

2. Description of the Related Art

Due to concerns relating to environmental destruction and depletion of natural resources, systems for storing electricity and effectively utilizing the stored electricity are attracting more attention than ever before. Further, the importance and interest in new renewable energies, such as photovoltaic, is increasing. This is due to the fact that renewable energy sources are for all practical purposes infinite in nature. Such renewable energy sources include sunlight, wind, and tides. They also have the added benefit of not creating pollutants to the environment during energy generation. Therefore, methods of utilizing renewable energy sources are being actively researched and developed.

Recently, by applying information technology to a conventional power grid, a smart grid system is becoming prominent as a system for optimizing energy efficiency by exchanging information between a power supplier and a consumer.

Furthermore, a photovoltaic system, in which photovoltaic technology and an uninterruptible power supply (UPS) are mutually connected, has recently been introduced.

The above information disclosed in this Related Art section is only for enhancement of understanding of the background of the invention and therefore it may contain information that does not form the prior art that is already known to a person of ordinary skill in the art.

SUMMARY

Aspects of the present invention include an energy storage system and a method of controlling the same for directly providing generated DC power or DC power stored in a battery to a DC load, which operates on DC power, only after being DC converted to power for driving the DC load without performing a DC/AC conversion or a AC/DC conversion, and for utilizing power stored in a battery at improved efficiency in the case where a grid operates abnormally (e.g. power interruption) and the energy storage system functions as an uninterruptible power supply (UPS).

Additional aspects will be set forth in part in the description which follows and, in part, will be apparent from the description, or may be learned by practice of the presented embodiments.

According to aspects of the present invention, an energy storage system including a maximum power point tracking (MPPT) converter, which converts power generated by a renewable energy generating system and outputs the converted power to a first node; a bi-directional inverter, which is interposed between the first node and a second node, to which a grid and an AC load are connected, converts first DC power input via the first node to AC power and outputs the converted AC power to the second node, and converts AC power provided by the grid to the first DC power and outputs the converted first DC power to the first node; a battery for storing a second DC power; a bi-directional converter, which is interconnected between the battery and the first node, converts the second DC power output by the battery to the first DC power and outputs the converted first DC power to the bi-directional inverter via the first node, and converts the first DC power output by the bi-directional inverter via the first node to the second DC power and stores the converted second DC power in the battery; a DC/DC converter, which is interconnected between the bi-directional converter and a DC load and provides DC power to the DC load; and an integrated controller, which controls the overall operations of the MPPT converter, the bi-directional inverter, the bi-directional converter, and the DC/DC converter.

The integrated controller may be configured to provide the first DC power or the second DC power stored in the battery to the DC load.

If a power interruption signal is received, the integrated controller is configured to selectively provide the second DC power to the DC load.

The energy storage system may further include a first switch interconnected between the bi-directional inverter and the AC load; and a second switch interconnected between the second load and the grid.

The integrated controller turns off the second switch when the power interruption signal is received.

At least two DC/DC converters, which are for respectively converting DC power to be provided to at least two DC loads, are interconnected between the bi-directional converter and the at least two DC loads, and the integrated controller controls each of at least two DC/DC converters based on an amount of the second DC power stored in the battery and a priority order of the at least two DC loads.

The integrated controller may include a monitoring unit for monitoring an amount of the second DC power stored in the battery; a user setup unit for setting up a priority order of the DC loads; a microcomputer for determining the amount of the second DC power stored in the battery and the priority order of the DC loads; and a control signal generating unit for generating control signals for selectively providing the second DC power stored in the battery to the DC loads under the control of the microcomputer.

The energy storage system further may include a battery management system (BMS) for managing charging/discharging the second DC power stored in the battery under the control of the integrated controller, wherein the integrated controller may further include a BMS controlling unit for controlling the BMS.

The energy storage system further may include a DC linking unit for maintaining the voltage level of a DC voltage of the first node to a DC linking level.

The renewable energy generating system may be a photovoltaic.

According to one or more embodiments of the present invention, an energy storage system includes a first power converting unit, which converts power generated by a renewable energy generating system to first power; a second power converting unit, which converts the first power to second power and stores the second power in a battery and converts the second power stored in the battery to the first power; a third power converting unit, which converts the first power and outputs the converted first power to a first load or a commercial load and converts power provided by the commercial load to the first power; a fourth power converting unit, which is interconnected between the second power converting unit and a second load and converts the first power or the second power to power for driving the second load; and a integrated controller for controlling the first through fourth power converting units.

If a power interruption signal is received, the integrated controller is configured to selectively provide power to the second load based on an amount of the second power stored in the battery and a priority order of the second load.

The first load may be an AC load, and the second load may be a DC load.

A plurality of the fourth power converting unit may be arranged based on a magnitude of power required to drive the DC load.

According to other aspects of the present invention, a method of controlling an energy storage system, which is connected to each of a renewable energy generating system, an AC load or a DC load, and a grid and includes a maximum power point tracking (MPPT) converter, which converts power generated by a renewable energy generating system and outputs the converted power to a first node; a battery for storing power generated by the renewable energy generating system or power provided by the grid; a bi-directional inverter, which converts power of the first node, outputs the converted power to the AC load or the grid, and converts power provided by the grid and outputs the converted power to the first node; a bi-directional converter, which converts power of the first node, stores the converted power in the battery, and converts power stored in the battery and outputs the converted power to the first node; a DC/DC converter, which is interconnected between the bi-directional converter and a DC load and provides DC power to the DC load; and an integrated controller, the method may include converting the generated power or AC power provided by the grid to first DC power; converting the first DC power or power stored in the battery to second DC power for driving the DC load; and providing the second DC power to the DC load.

The method may further include receiving a power interruption signal from the grid; and converting power stored in the battery to the second DC power corresponding to the DC load.

The method may further include determining an amount of power stored in the battery; and determining a priority order of the DC load, wherein the second DC power is selectively provided to the DC load based on the amount of power stored in the battery and the priority order of the DC load.

The method may further include turning off a switch connected to the grid when the power interruption signal is received.

The renewable energy generating system may be a photovoltaic.

The method may further include stabilizing a voltage level of the first node to a DC linking level.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 6 is a flowchart for describing a method of controlling an energy storage system according to another embodiment of the present invention.

DETAILED DESCRIPTION

Figure 1:
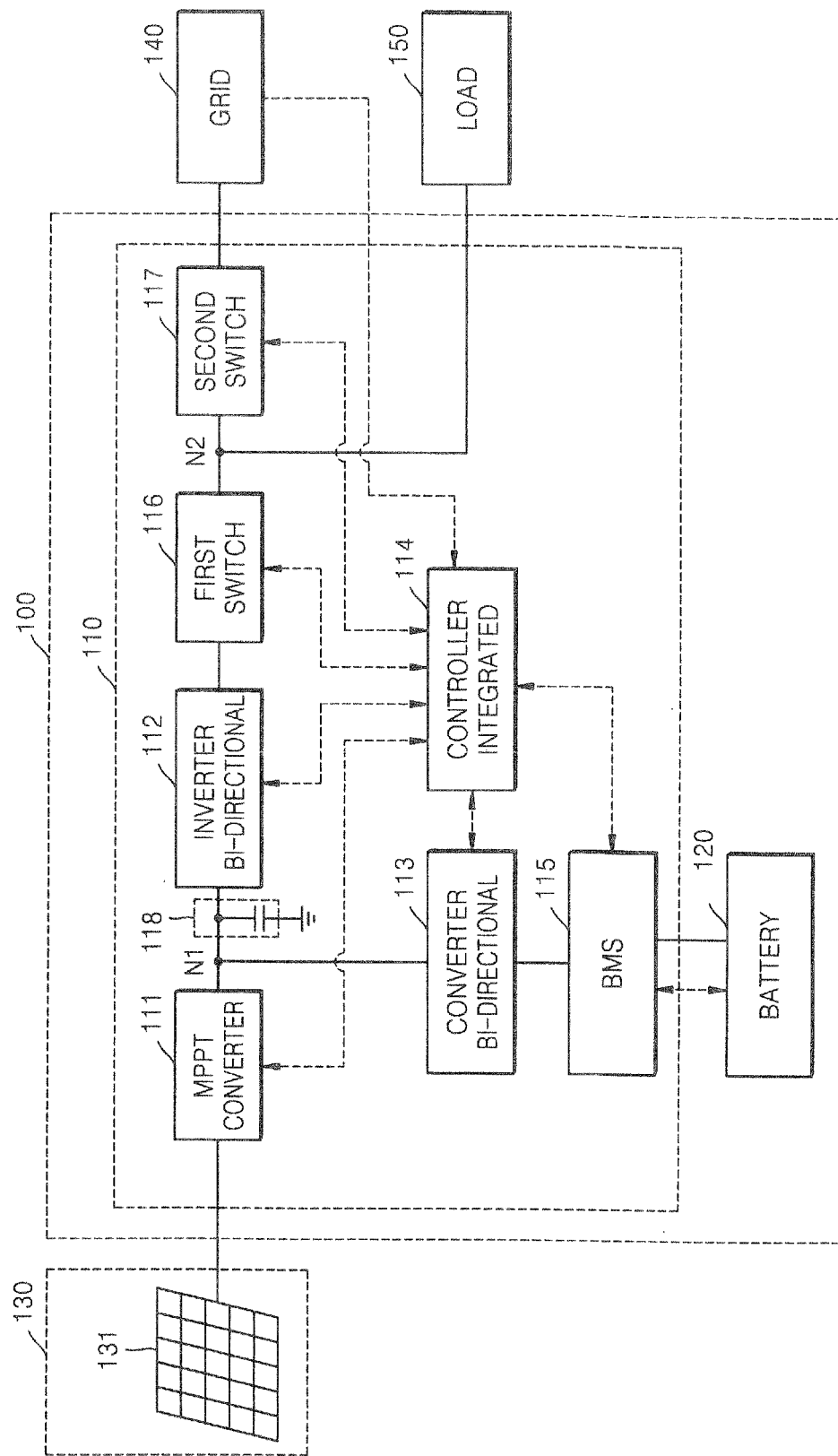
FIG. 1 is a block diagram of a grid-connected energy storage system according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

In the description of the present invention, if it is determined that a detailed description of commonly-used technologies or structures related to the invention may unnecessarily obscure the subject matter of the invention, the detailed description will be omitted.

Also, since later-described terms are defined in consideration of the functions of the present invention, they may vary according to users' intentions or practice. Hence, the terms must be interpreted based on the contents of the entire specification.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

FIG. 1 is a block diagram of a grid-connected energy storage system 100 according to an embodiment of the present invention.

Referring to FIG. 1, a power management system 110 includes a maximum power point tracking (referred to hereinafter as 'MPPT') converter 111, a bi-directional inverter 112, a bi-directional converter 113, a integrated controller 114, a battery management system (referred to hereinafter as 'BMS') 115, a first switch 116, a second switch 117, and a DC linking unit 118. The power management system 110 is connected to a battery 120, a photovoltaic (referred to hereinafter as 'PV') 130, a grid 140, and a load 150. Although the grid-connected energy storage system 100 includes the power management system 110 and the battery 120 in the present embodiment, the present invention is not limited thereto, and the grid-connected energy storage system 100 may be a power management system or a grid-connected energy storage system, in which the power management system 110 and the battery 120 are integrated.

Although the present embodiment is described with respect to the PV 130, the present invention is not limited thereto, and the PV 130 may be replaced with any of various renewable energy generating systems. The PV 130 generates electric energy and outputs the electric energy to the power management system 110. Here, the renewable energy generating system may also be a wind power generating system, a tidal power generating system, or any of various systems generating electric energy from renewable energies such as solar power or geothermal power. Especially, a solar battery, which generates electric energy from sunlight, may easily be installed in households and factories, and thus a solar battery is suitable for the grid-connected energy storage system 100 which may be distributed to households.

The grid 140 includes power plants, substations, and power lines. The grid 140 supplies power to the battery 120 or the load 150 according to ON/OFF states of the first switch 116 and the second switch 117 during normal operation of the grid 140, and receives power supplied from the PV 130 or the battery 120. When the grid 140 does not operate normally (e.g. accidental power interruption or power interruption due to electric works), power supply from the grid 140 to the battery 120 or the load 150 may cease, and power supply from the PV 130 or the battery 120 to the grid 140 may also cease.

The load 150 consumes power generated by the PV 130, power stored in the battery 120, or power supplied by the grid 140, and may be a household, residential, commercial, or a factory.

The MPPT converter 111 converts DC voltage output by the solar battery 131 to DC voltage to be transmitted to a first node N1, and, since output of the solar battery 131 is affected by temperature variations (e.g. solar flux and temperature) and load conditions, the MPPT converter 111 controls the solar battery 131 to generate power at maximum efficiency. In other words, the MPPT converter 111 functions as both a boost DC-DC converter, which boosts DC voltage output by the solar battery 131, and a MPPT controller. For example, DC voltage output by the MPPT converter 111 may be from about 300 V to about 600 V. Furthermore, the MPPT converter 111 functions as the MMPT controller to track voltage of the maximum power output by the solar battery 131 according to variations of solar flux and temperature. For example, the MMPT converter 111 may perform a perturbation and observation (P&O) control method, an incremental conductance (IncCond) control method, or a power-to-voltage control method. The P&O control method is a method of measuring power and voltage of a solar battery and increasing or decreasing a reference voltage based on the measurement. The IncCond control method is a method of controlling a solar battery based on comparison of output conductance of the solar battery and incremental conductance. The power-to-voltage control method is a method of controlling a solar battery based on a slope of a graph representing the power-to-voltage. Furthermore, any of various MPPT control methods other than the control methods described above may be performed.

The DC linking unit 118 is interconnected between the first node N1 and the bi-directional inverter 112 in parallel. The DC linking unit 118 maintains a DC voltage output by the MPPT converter 111 as a DC linking voltage (e.g. a DC voltage of 380 V) and provides the DC linking voltage to the bi-directional inverter 112 or the bi-directional converter 113. Here, the DC linking unit 118 may be an aluminum electrolytic capacitor, a polymer capacitor, or a multi layer ceramic capacitor (MLCC). The voltage level of the first node N1 may become unstable due to variations in DC voltage output by the solar battery 131, instantaneous voltage sag of the grid 140, or peak load at the load 150. Therefore, the DC linking unit 118 provides a stable DC linking voltage for normal operations of the bi-directional converter 113 and the bi-directional inverter 112.

Although the DC linking unit 118 is shown as an independent component in the embodiment shown in FIG. 1, the DC linking unit 118 may be integrated in the bi-directional converter 113, the bi-directional inverter 112, or the MPPT converter 111.

The bi-directional inverter 112 is interconnected between the first node N1 and the grid 140. The bi-directional inverter 112 converts a DC voltage output by the MPPT converter 111 and a DC voltage output by the bi-directional converter 113 to an AC voltage of the grid 140 or the load 150, converts a AC voltage provided by the grid 140 to a DC voltage, and transmits the DC voltage to the first node N1. In other words, the bi-directional inverter 112 functions as an inverter converting a DC voltage to an AC voltage and a rectifier converting an AC voltage to a DC voltage.

The bi-directional inverter 112 rectifies an AC voltage input from the grid 140 via the first switch 116 and the second switch 117 to a DC voltage to be stored in the battery 120 and outputs the DC voltage, and converts a DC voltage output by the battery 120 to an AC voltage of the grid 140 and outputs the AC voltage. Here, the AC voltage output to the grid 140 should meet the power quality standards of the grid 140 (e.g. power rate above 0.9 and THN within 5%). To meet the standards, the bi-directional inverter 112 should reduce inproper power generation by synchronizing the phase of an output AC voltage with the phase of the grid 140. Furthermore, the bi-directional inverter 112 may include a filter to remove high frequencies from an AC voltage output to the grid 140, and may perform various functions, such as limiting a range of voltage variations, improving a power rate, removing DC components, and protecting from transient phenomena. The bi-directional inverter 112 according to an embodiment of the present invention functions as an inverter converting a DC voltage of a power generating system 230 or the battery 120 to an AC voltage to be provided to the grid 140 or the load 150, and functions as a rectifier converting an AC voltage provided by the grid 140 to a DC voltage to be provided to the battery 120.

The bi-directional converter 113 is interconnected between the first node N1 and the battery 120, and converts a DC voltage of the first node NI to a DC voltage to be stored in the battery 120. Furthermore, the bi-directional converter 113 converts a DC voltage stored in the battery 120 to a DC voltage to be transmitted to the first node N1. For example, in the case where the battery 120 is charged with DC power generated by the PV 130 in a battery charging mode, the bi-directional converter 113 functions as a converter which decreases the voltage level of a DC voltage of the first node N1 or the voltage level of a DC linking voltage maintained by the DC linking unit 118 (e.g. DC 380V) to the voltage level of a voltage to be stored in the battery 120 (e.g. DC 100V). Furthermore, in the case where power stored in the battery 120 is provided to the grid 140 or the load 150 in a battery discharging mode, the bi-directional converter 113 functions as a converter which boosts the voltage level of a voltage stored in the battery 120 (e.g. DC 100 V) to the voltage level of a DC voltage of the first node N1 or the voltage level of a DC linking voltage (e.g. DC 380 V). The bi-directional converter 113 according to an embodiment of the present invention converts DC power generated by the PV 130 or DC power converted from AC power provided by the grid 140 to DC power to be stored in the battery 120, and converts DC power stored in the battery 120 to DC power to be input to the bi-directional inverter 112, so that the DC power may be provided to the grid 140 or the load 150.

The battery 120 stores power provided by the PV 130 or the grid 140. The battery 120 may include a plurality of battery cells connected in series or in parallel for increased capacity and increased power output. Operations of charging and discharging the battery 120 are controlled by the BMS 115 or the integrated controller 114. The battery 120 may include various types of battery cells; e.g. nickel-cadmium (NiCd) battery cells, lead storage battery cells, nickel metal hydride (NiMH) battery cells, lithium ion battery cells, and lithium polymer battery cells. The number of battery cells constituting the battery 120 may be determined based on the necessary power capacity or schematic conditions of the grid-connected energy storage system 100.

The BMS 115 is connected to the battery 220 and controls operations of charging and discharging the battery 120 based on instructions from the integrated controller 114. Both discharging power from the battery 120 to the bi-directional converter 113 and charging power from the bi-directional converter 113 to the battery 112 are transmitted via the BMS 115. Furthermore, the BMS 115 may perform various functions to protect the battery 120, the functions including overcharging protection, over-discharging protection, excessive current protection, overheating protection, and cell balancing. Thus, the BMS 115 may detect voltage, current, and temperature of the battery 120, calculate a state of charge (referred to hereinafter as 'SOC') and a state of health (referred to hereinafter as 'SOH') based on the detected information, and monitor remaining power and the lifespan of the battery 120.

The BMS 115 may include a sensor for detecting voltage, current, and temperature of the battery 120, a microcomputer for determining overcharge, over-discharge, excessive current, cell balance, the SOC, and the SOH based on information detected by the sensor, and a protective circuit for performing functions, such as charge/discharge prohibition, fuse cutting, and cooling under the control of the microcomputer. Here, the BMS 115 is integrated in the power management system 110 and is separate from the battery 120. However, the present invention is not limited thereto, and the BMS 115 and the battery 120 may be integrated in a single battery pack. Furthermore, the BMS 115 controls operations of charging and discharging the battery 120 under the control of the integrated controller 114, and transmits information regarding the state of the battery 120 (e.g. the amount of charged power calculated based on the SOC) to the integrated controller 114.

The first switch 116 is interconnected between the bi-directional inverter 112 and a second node N2. The second switch 117 is interconnected between the second node N2 and the grid 140. The first switch 116 and the second switch 117 may be a switch turned on or off under the control of the integrated controller 114. The first switch 116 and the second switch 117 allow or block power provided from the PV 130 or the battery 120 to the grid 140 or the load 150 and allow or block power provided from the grid 140 to the load 150 or the battery 120. For example, the integrated controller 114 turns on the first and second switches 116 and 117 in the case where power generated by the PV 130 or power stored in the battery 120 is provided to the grid 140, whereas the integrated controller 114 turns on only the first switch 116 and turns off the second switch 117 in the case where power is provided only to the load 150. Furthermore, in the case where power of the grid 140 is provided only to the load, the integrated controller 114 turns off the first switch 116 and turns on the second switch 117.

In the case that the grid 140 does not operate normally (e.g. power interruption or service wire problem), the second switch 117 blocks power provided to the grid 140 and embodies a unilateral operation of an energy storage system. Here, the integrated controller 114 separates the power management system 110 from the grid 140 to maintain tracking of the grid 140, to prevent a close-range accident occurring (e.g. a repairman gets an electric shock), and to prevent the grid 140 from adversely affecting electric installations due to abnormal operation. Furthermore, in the case of the unilateral operation of an energy storage system when the grid 140 operates abnormally, that is, in the case where the grid 140 has recovered after power generated by the PV 130 or power stored in the battery 120 is provided to the load 150, a phase difference occurs between a voltage of the grid 140 and a voltage output by the battery 120, which operates unilaterally, and thus the power management system 110 may be damaged. Therefore, the integrated controller 114 performs unilateral operation controls to prevent such problems.

The integrated controller 114 controls overall operations of the power management system 110 or the energy storage system 100. According to an embodiment of the present invention, the integrated controller 114 detects a power interruption signal of the grid 150, and, in the case where a power interruption signal is received, performs control operations for transmitting DC power stored in the battery 120 to the load 150. In this case, in order to provide power stored in the battery 120 to the load 150, the integrated controller 114 turns off the bi-directional inverter 112 and the MPPT converter 111, turns on the bi-directional converter 113, performs constant voltage control on a voltage of the first node N1 by using power stored in the battery 120, and provides power to the load 150 by turning on the bi-directional inverter 112. Furthermore, in the case where the PV 130 may be operated, the integrated controller 114 may selectively operate the MPPT converter 111 so as to gradually provide power generated by the PV 130 to the load 150 together with power stored in the battery 120.

Figure 2:
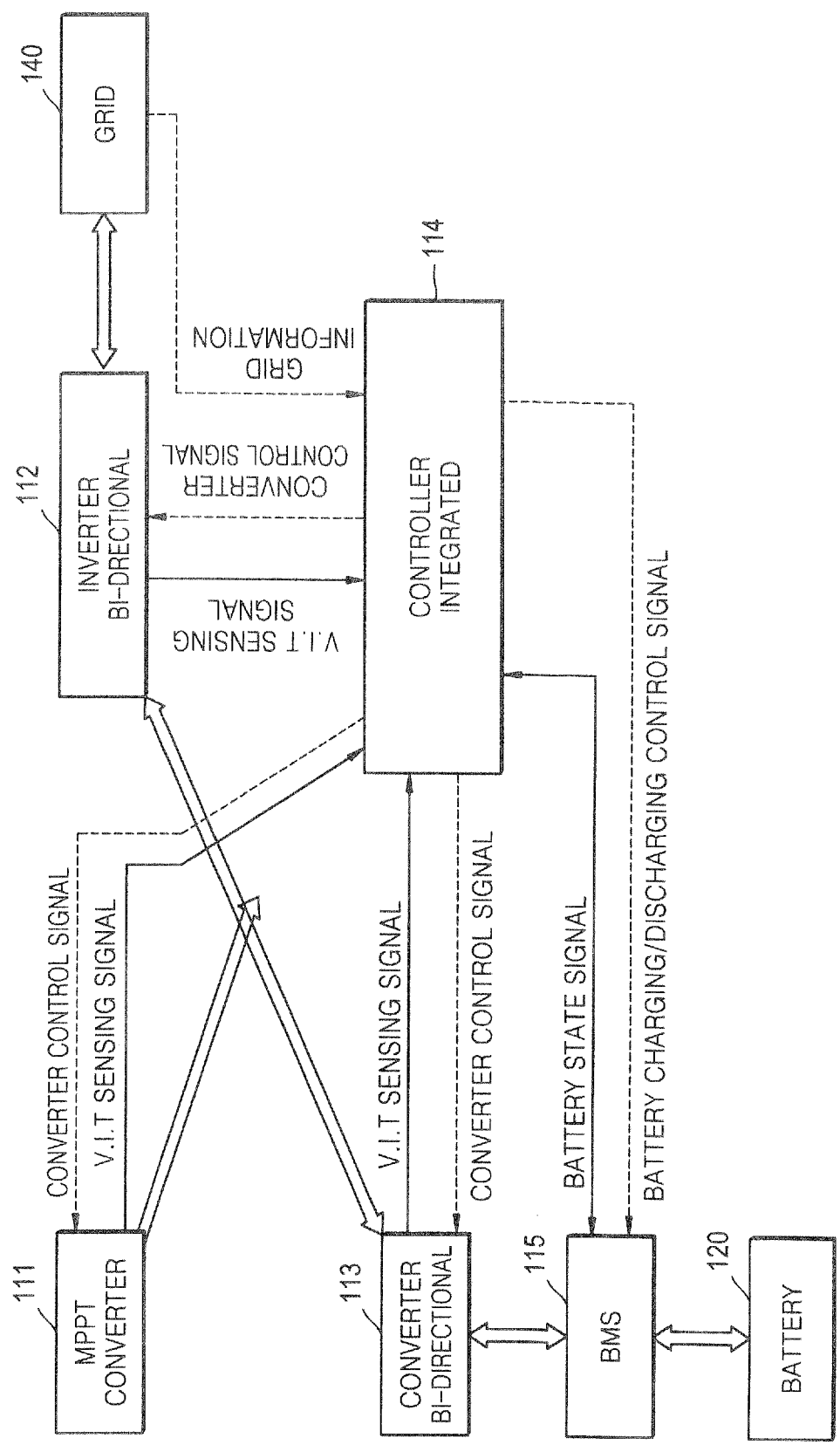
FIG. 2 is a flowchart of power and control signals of the grid-connected energy storage system shown in FIG. 1.

FIG. 2 is a flowchart of power and control signals of the grid-connected energy storage system 100 shown in FIG. 1.

FIG. 2 shows power flows and flows of control of the integrated controller 114 among the internal components of the grid-connected energy storage system 100 shown in FIG. 1. As shown in FIG. 2, a DC voltage converted by the MPPT converter 111 is provided to the bi-directional inverter 112 and the bi-directional converter 113, and the voltage is either converted to an AC voltage and is provided to the grid 140 by the bi-directional inverter 112 or converted to a DC voltage to be stored in the battery 120 and is provided to the battery 120 via the BMS 115 by the bi-directional converter 113. The DC voltage stored in the battery 120 is converted to a DC voltage to be input to the bi-directional inverter 112 by the bi-directional converter 113, and the converted DC voltage is converted to an AC voltage to meet standards of the grid 140 and is provided to the grid 140 by the bi-directional inverter 112.

The integrated controller 114 controls overall operations of the grid-connected energy storage system 100, and determines an operation mode of the grid-connected energy storage system 100. In other words, the integrated controller 114 determines whether to provide generated power to a grid or not, whether to provide the generated power to a load or not, whether to store the generated power in a battery or not, whether to store power provided by a grid in the battery or not, etc.

The integrated controller 114 transmits control signals to each of the MPPT converter 111, the bi-directional inverter 112, and the bi-directional converter 113 for controlling switching operations of each of the MPPT converter 111, the bi-directional inverter 112, and the bi-directional converter 113. Here, a control signal minimizes power loss due to power conversion of a converter or an inverter by performing optimal duty ratio control based on voltages input to each of the converters or inverter. Thus, the integrated controller 114 receives detection signals, which are information obtained by detecting voltage, current, and temperature of input terminals of each of the MPPT converter 111, the bi-directional inverter 112, and the bi-directional converter 113, and transmits converter control signals and inverter control signals based on the detection signals.

The integrated controller 114 receives grid information, which includes state information of the grid (e.g. information regarding voltage, current, and temperature of the grid) from the grid 140. Based on the grid information, the integrated controller 114 determines an operation state of the grid 140 and whether to execute power recovery of the grid 140, and prevents unilateral operation of the grid 140 by blocking power provided to the grid 140 and matching the output of the bi-directional inverter 112 and power provided to the grid 140 after power recovery.

The integrated controller 114 communicates with the BMS 115, receives a battery state signal, that is, a battery charging/discharging state signal, and determines an operation mode of the entire system based on the battery charging/discharging state signal. Furthermore, based on an operation mode, the integrated controller 114 transmits a battery charging/discharging state signal to the BMS 115, and the BMS 115 controls charging/discharging of the battery 120 based on the battery charging/discharging state signal.

According to an embodiment of the present invention, the integrated controller 114 may selectively provide power to loads based on priorities designated to the loads and the amount of power stored in the battery 120. Therefore, before power stored in the battery 120 is completely discharged, the integrated controller 114 may separate loads with higher priorities and may preferentially provide power thereto.

Figure 3:
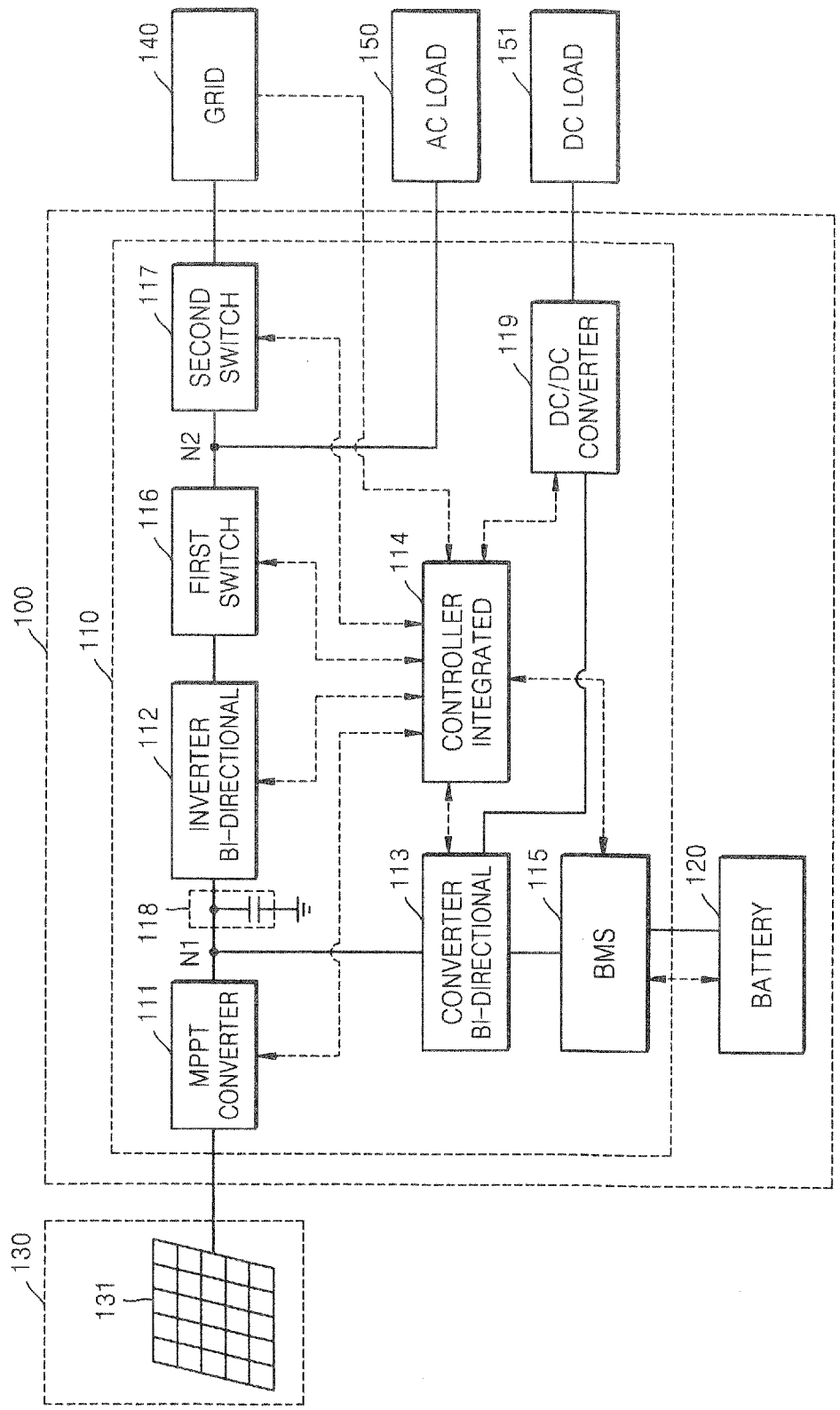
FIG. 3 is a block diagram of the grid-connected energy storage system according to another embodiment of the present invention.

FIG. 3 is a block diagram of the grid-connected energy storage system 100 according to another embodiment of the present invention.

Referring to FIG. 3, the grid-connected energy storage system 100 according to the present embodiment is identical to the grid-connected energy storage system 100 shown in FIG. 1 except that a DC/DC converter 119 is interconnected between the bi-directional converter 113 and a DC load 151. Here, the DC load 151 refers to a load that operates on DC power. Examples of DC loads include a TV, a PC, or a charger for a mobile device. Most conventional consumer electronics receive AC power (110V, 120V, or 220 V) provided by a grid, convert the AC power to DC power, and operate on the converted DC power.

The DC/DC converter 119 converts DC power output by the MPPT converter 111 and DC power converted by the bi-directional inverter 112, which received AC power from the grid 140, to a DC driving power of the DC load 151. For example, the DC/DC converter 119 converts the voltage level of the DC voltage of the first node N1, which is DC 380 V, down to the voltage level of a voltage for driving a refrigerator; e.g. a few dozen volts (V) for driving a DC motor. Furthermore, in the case of a display device, the DC/DC converter 119 converts the voltage level of DC voltage of the first node N1, which is DC 380 V, down to the voltage level of a power driving voltage; e.g. several volts (V). Here, a plurality of the DC/DC converters 119 may be arranged based on the magnitude of a voltage for driving the DC load 151. The DC/DC converter 119 performs conversion under the control of the integrated controller 114.

Furthermore, the DC/DC converter 119 receives power stored in the battery 120 and converts the power to DC power corresponding to a voltage for driving the DC load 151. For example, the DC/DC converter 119 may convert a DC voltage of 100 V stored in the battery 120 down to a DC voltage of several volts (V) and may provide the converted-down DC voltage to a DC load directly. Therefore, energy loss, which occurs due to re-conversion of AC power back to DC power via a converter within a power adaptor or a consumer electronic device when DC power generated by a renewable energy generating system is converted to the AC power and the AC power is provided to a DC load, may be reduced. Furthermore, DC power discharged from a battery may be used by a DC load after being converted to power for driving the DC load. Therefore, generated DC power or DC power stored in a battery may be directly provided to a DC load, which operates on DC power, only after being DC converted to power for driving the DC load without performing a DC/AC conversion or a AC/DC conversion.

Figure 4:
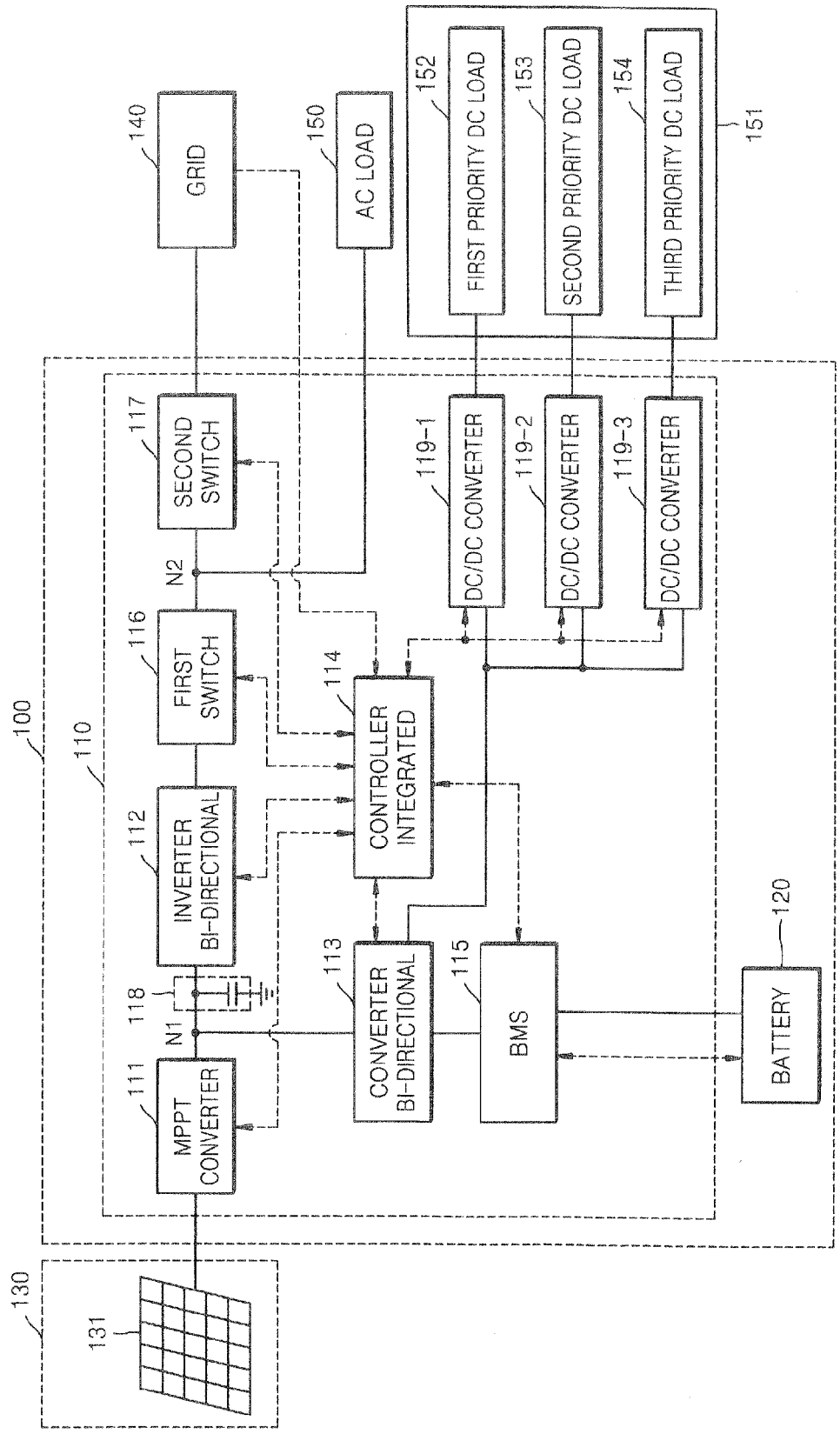
FIG. 4 is a block diagram of the grid-connected energy storage system according to another embodiment of the present invention.

FIG. 4 is a block diagram of the grid-connected energy storage system 100 according to another embodiment of the present invention.

Referring to FIG. 4, the DC load 151 includes a first priority load 152, a second priority load 153, and a third priority load 154. Here, the first priority load 152 includes devices to which power should be constantly provided even during power interruption or when power is not sufficiently provided, such as essential consumer electronics (e.g. a refrigerator). The second priority load 152 may be a TV or a lighting device, and the third priority load 153 may be selective electronics, such as an audio device. Priority orders of loads are not limited thereto, and a user may set up a random priority order. DC-DC converters 119-1 through 119-3 are respectively interconnected between the bi-directional inverter 113 and each of the DC loads 152 through 154, and each of the DC-DC converters 119-1 through 119-3 converts DC power to be provided to the first through third priority loads 152 through 154 under the control of the integrated controller 114. In other words, each of the DC-DC converters 119-1 through 119-3 is turned on/off by the integrated controller 114 and converts DC power to be provided to the first through third priority loads 152 through 154.

When a power interruption signal is received from the grid 140, the integrated controller 114 may provide power to the DC load 151 by selectively operating the DC-DC converters 119-1 through 119-3 based on the amount of power stored in the battery 120 and the priority order of the DC load 151. For example, in the case where power charged to the battery 120 is above 90% of the entire capacity of the battery 120, the integrated controller 114 operates the DC-DC converters 119-1 through 119-3 for providing power to all loads, that is, the first through third priority loads 152 through 154, so that power stored in the battery 120 may be converted to DC powers for driving each of the loads. Meanwhile, in the case where power charged to the battery 120 is below 90% of the entire capacity of the battery 120, the integrated controller 114 only turns on the DC-DC converters 119-1 and 119-2, and turns of the DC-DC converter 119-3 to block power provided to the third priority load 154.

Figure 5:
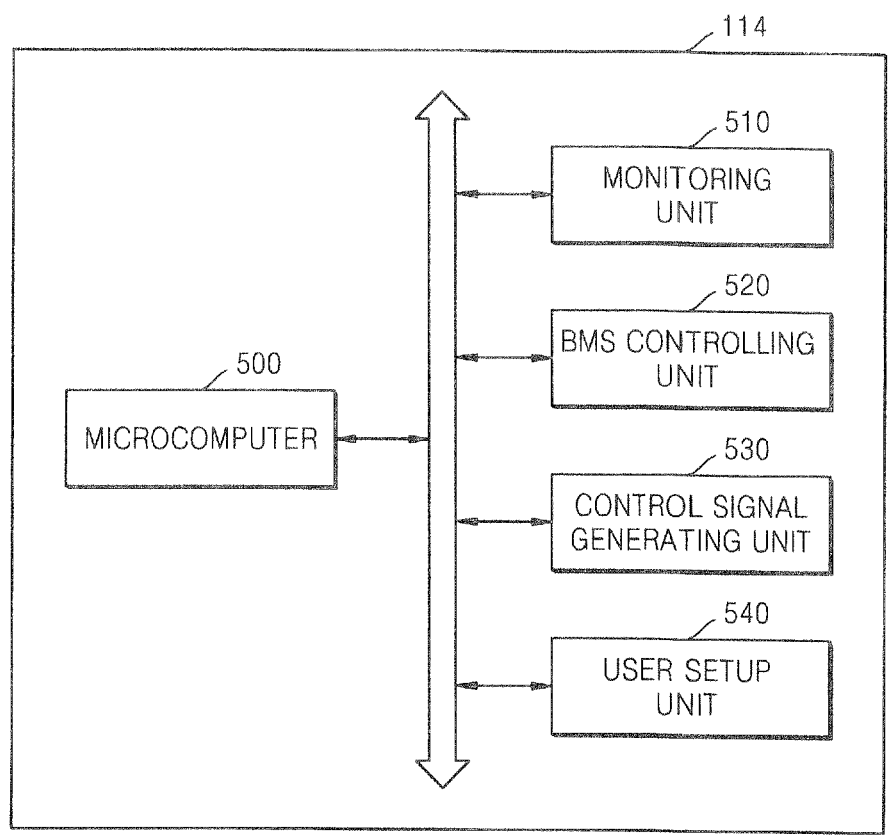
FIG. 5 is a block diagram of the integrated controller shown in FIGS. 3 and 4.

FIG. 5 is a block diagram of the integrated controller 114 shown in FIGS. 3 and 4.

Referring to FIG. 5, the integrated controller 114 includes a microcomputer 500, a monitoring unit 510, a BMS controlling unit 520, a control signal generating unit 530, and a user setup unit 540.

The microcomputer 500 controls the overall operations of the integrated controller 114. The monitoring unit 510 monitors the amount of power stored in the battery 120. Furthermore, the monitoring unit 510 detects the states of the grid 140 and receives a power interruption signal. The monitoring unit 510 detects not only the states of a grid, but also voltages, currents, and temperatures of the MPPT converter 111, the bi-directional inverter 112, and the bi-directional converter 113, and monitors states of the battery 120; e.g. voltage, current, charging/discharging state, lifespan, etc.

The BMS controlling unit 520 communicates with the BMS 115 and controls operations of charging/discharging the battery 120. According to an embodiment of the present invention, the BMS controlling unit 520 controls discharging power stored in the battery 120 in case of a power interruption.

The control signal generating unit 530 generates control signals for providing power according to the priority order of the load 150 under the control of the microcomputer 500. In other words, the control signal generating unit 530 generates control signals for turning on/off the DC/DC converters 119-1 through 119-3 respectively connected to each of loads. Furthermore, the control signal generating unit 530 generates control signals for turning on/off the MPPT converter 111, the bi-directional inverter 112, and the bi-directional converter 113.

The user setup unit 540 sets up the priority order of the DC load 151 based on user selection. In other words, the user setup unit 540 designates a first priority load, a second priority load, and a third priority load.

FIG. 6 is a flowchart for describing a method of controlling an energy storage system according to another embodiment of the present invention.

Referring to FIG. 6, in operation 600, DC power generated by a PV or AC power provided by a grid is converted to DC power. Here, the DC power may be DC power of 380 V. In operation 602, DC/DC conversion is performed. Here, the DC power of 380 V is converted down to DC power for driving a DC load (e.g. DC power of several volts (V)). In operation 604, the converted DC power is directly provided to the DC load.

In operation 606, if a power interruption signal is received, the method proceeds to operation 608 and a priority order is set for DC loads. Here, the priority order may be randomly set by a user. In an operation 610, power is selectively converted based on the amount of DC power stored in a battery and the priority order of DC loads, and the converted DC power is directly provided to the DC loads.

For example, in the case where power charged to a battery is above 90% of the entire capacity of the battery, the DC-DC converters 119-1 through 119-3 are turned on to provide power to all DC loads. Meanwhile, in the case where power charged to the battery is below 90% of the entire capacity of the battery, only the DC-DC converters 119-1 and 119-2 are turned on, and the DC-DC converter 119-3 is turned off to block power provided to the third priority load. In the case where power charged to the battery is below 50% of the entire capacity of the battery, only the DC-DC converter 119-1 is turned on and the other DC-DC converters 119-2 and 119-3 are turned off, so that power is provided to the first priority load and power provided to the second and third priority loads is blocked. In the case where power charged to the battery is below 10% of the entire capacity of the battery, power provided to all loads are blocked to prevent the battery from being completely discharged. Therefore, the grid-connected energy storage system 100 may operate stably.

Accordingly, by selectively providing power to loads, for which a priority order is set up, based on remaining power of a battery, power may be provided to a load, which is preferentially desired by a user, for a longer period of time, and thus efficiency of energy usage may be improved.

As described above, according to one or more of the above embodiments of the present invention, an energy storage system according to an embodiment of the present invention may directly provide generated DC power or DC power stored in a battery to a DC load, which operates on DC power, only after being DC converted to power for driving the DC load without performing a DC/AC conversion or a AC/DC conversion. Furthermore, in the case where a grid operates abnormally (e.g. power interruption) and the energy storage system according to an embodiment of the present invention functions as an uninterruptible power supply (UPS), power stored in a battery may be utilized at improved efficiency.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An energy storage system, comprising:
a maximum power point tracking (MPPT) converter, which converts power generated by a renewable energy generating system and outputs the converted power to a first node;
a bi-directional inverter, which is interposed between the first node and a second node, to which a grid and an AC load are connected, converts a first DC power input via the first node to AC power and outputs the converted AC power to the second node, and converts AC power provided by the grid to the first DC power and outputs the converted first DC power to the first node;
a battery for storing a second DC power;
a bi-directional converter, which is interconnected between the battery and the first node, converts the second DC power output by the battery to the first DC power and outputs the converted first DC power to the bi-directional inverter via the first node, and converts the first DC power output by the bi-directional inverter via the first node to the second DC power and stores the converted second DC power in the battery;
at least two DC/DC converters, which are for respectively converting DC power to be provided to at least two DC loads, are interconnected between the bi-directional converter and the at least two DC loads; and
an integrated controller, which controls the overall operations of the MPPT converter, the bi-directional inverter, and the bi-directional converter, the integrated controller controls each of the at least two DC/DC converters based on an amount of the second DC power stored in the battery and a priority order of the at least two DC loads.

2. The energy storage system of claim 1, wherein the integrated controller is configured to provide the first DC power or the second DC power stored in the battery to the at least two DC loads.

3. The energy storage system of claim 1, wherein if a power interruption signal is received, the integrated controller is configured to selectively provide the second DC power to the at least two DC loads.

4. The energy storage system of claim 1, further comprising:
- a first switch interconnected between the bi-directional inverter and the AC load; and
- a second switch interconnected between the AC load and the grid.

5. The energy storage system of claim 3, wherein the integrated controller turns off the second switch when the power interruption signal is received.

6. The energy storage system of claim 1, wherein the integrated controller further comprises:
- a monitoring unit for monitoring an amount of the second DC power stored in the battery;
- a user setup unit for setting up a priority order of the at least two DC loads;
- a microcomputer for determining the amount of the second DC power stored in the battery and the priority order of the at least two DC loads; and
- a control signal generating unit for generating control signals for selectively providing the second DC power stored in the battery to the at least two DC loads under the control of the microcomputer.

7. The energy storage system of claim 6, further comprising:
- a battery management system (BMS) for managing charging/discharging the second DC power stored in the battery under the control of the integrated controller,
- wherein the integrated controller further comprises a BMS controlling unit for controlling the BMS.

8. The energy storage system of claim 1, further comprising:
- a DC linking unit for maintaining the voltage level of a DC voltage of the first node to a DC linking level.

9. The energy storage system of claim 1, wherein the renewable energy generating system is a photovoltaic.

10. An energy storage system, comprising:
- a first power converting unit, which converts power generated by a renewable energy generating system to a first power;
- a second power converting unit, which converts the first power to a second power and stores the second power in a battery and converts the second power stored in the battery to the first power;
- a third power converting unit, which converts the first power and outputs the converted first power to a first load or a commercial load and converts power provided by the commercial load to the first power;
- a fourth power converting unit, which is interconnected between the second power converting unit and a second load and converts the first power or the second power to power for driving the second load at least two fourth power converting units, which are for respectively converting DC power to be provided to at least two DC loads, are interconnected between the second power converting unit and the at least two DC loads; and
- an integrated controller for controlling the first through fourth power converting units, the integrated controller controls each of the first through fourth power converting units based on an amount of the second DC power stored in the battery and a priority order of the at least two DC loads.

11. The energy storage system of claim 10, wherein if a power interruption signal is received, the integrated controller is configured to selectively provide power to the second load based on an amount of the second power stored in the battery and a priority order of the second load.

12. The energy storage system of claim 10, wherein the first load is an AC load, and the second load is a DC load.

13. The energy storage system of claim 12, further comprising:
- a plurality of the fourth power converting unit are arranged based on a magnitude of power required to drive the DC load.

14. A method of controlling an energy storage system, which is connected to each of a renewable energy generating system, an AC load or a DC load, and a grid and comprises a maximum power point tracking (MPPT) converter, which converts power generated by a renewable energy generating system and outputs the converted power to a first node; a battery for storing power generated by the renewable energy generating system or power provided by the grid; a bi-directional inverter, which converts power of the first node, outputs the converted power to the AC load or the grid, and converts power provided by the grid and outputs the converted power to the first node; a bi-directional converter, which converts power of the first node, stores the converted power in the battery, and converts power stored in the battery and outputs the converted power to the first node; a DC/DC converter, which is interconnected between the bi-directional converter and a DC load and provides DC power to the DC load; at least two DC/DC converters, which are for respectively converting DC power to be provided to at least two DC loads, are interconnected between the bi-directional converter and the at least two DC loads; and an integrated controller, the integrated controller controls each of the at least two DC/DC converters based on an amount of power stored in the battery and a priority order of the at least two DC loads, the method comprising:
- converting the generated power or AC power provided by the grid to a first DC power;
- converting the first DC power or the power stored in the battery to a second DC power for driving the DC load; and
- providing the second DC power to the DC load.

15. The method of claim 14, further comprising:
- receiving a power interruption signal from the grid; and
- converting power stored in the battery to the second DC power corresponding to the at least two DC loads.

16. The method of claim 15, further comprising:
- determining an amount of power stored in the battery; and
- determining a priority order of the at least two DC loads,
- wherein the second DC power is selectively provided to the at least two DC loads based on the amount of power stored in the battery and the priority order of the at least two DC loads.

17. The method of claim 15, further comprising:
- turning off a switch connected to the grid when the power interruption signal is received.

18. The method of claim 14, wherein the renewable energy generating system is a photovoltaic.

19. The method of claim 14, further comprising:
- stabilizing a voltage level of the first node to a DC linking level.

* * * * *